(12) United States Patent
Lu et al.

(10) Patent No.: US 9,060,659 B2
(45) Date of Patent: Jun. 23, 2015

(54) CLEANING VEHICLE AND CANTILEVER SYSTEM OF THE CLEANING VEHICLE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kai-Ming Lu, New Taipei (TW); Feng Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 184 days.

(21) Appl. No.: 13/709,072

(22) Filed: Dec. 10, 2012

(65) Prior Publication Data
US 2014/0115814 A1    May 1, 2014

(30) Foreign Application Priority Data
Oct. 30, 2012    (CN) .......................... 2012 1 0423423

(51) Int. Cl.
| A47L 5/14 | (2006.01) |
| A47L 9/00 | (2006.01) |
| B08B 1/04 | (2006.01) |
| B08B 3/02 | (2006.01) |

(52) U.S. Cl.
CPC . *A47L 9/009* (2013.01); *A47L 5/14* (2013.01); *B08B 1/04* (2013.01); *B08B 3/022* (2013.01); *B08B 2203/0229* (2013.01)

(58) Field of Classification Search
CPC ..... A47L 9/009; A47L 9/2842; A47L 9/2857; A47L 9/19; A47L 5/14; A47L 11/4044; A47L 11/4088; A47L 2201/00; E01H 1/0854; E01H 1/0836; E01H 1/0827
USPC ........ 15/301, 319, 320, 339, 340.1, 345, 302, 15/313, 3, 308, 309, 312.1, 256.52
See application file for complete search history.

(56) References Cited

U.S. PATENT DOCUMENTS

| 3,104,406 | A | * | 9/1963 | Rhodes | 15/53.1 |
| 4,707,879 | A | * | 11/1987 | Moszkowski | 15/345 |
| 5,115,531 | A | * | 5/1992 | Suzuki | 15/53.2 |
| 5,159,737 | A | * | 11/1992 | Kimura et al. | 15/314 |
| 5,473,793 | A | * | 12/1995 | Johnson | 15/330 |
| 6,317,919 | B1 | * | 11/2001 | Dahlin et al. | 15/314 |
| 6,804,856 | B2 | * | 10/2004 | Udall | 15/302 |
| 7,017,226 | B2 | * | 3/2006 | Ikeda et al. | 15/308 |
| 7,891,048 | B2 | * | 2/2011 | Mensch | 15/340.1 |
| 8,516,649 | B2 | * | 8/2013 | Crockett | 15/313 |
| 2014/0115815 | A1 | * | 5/2014 | Lu et al. | 15/320 |

* cited by examiner

*Primary Examiner* — Dung Van Nguyen
(74) *Attorney, Agent, or Firm* — Novak Druce Connolly Bove + Quigg LLP

(57) ABSTRACT

A cleaning vehicle includes a vehicle body, a cantilever system, and a cleaning apparatus. The cantilever system includes a rotary table fixed on the vehicle body, a first cantilever pivotably mounted on the rotary table, and a second cantilever pivotably connected to the first cantilever. The cleaning apparatus is fixed to one end of the second cantilever opposite to the first cantilever. The cantilever system further includes a first adjusting pole, a second adjusting pole, and a third adjusting pole, for adjusting the position and the angle of the cleaning apparatus.

5 Claims, 5 Drawing Sheets

CLEANING VEHICLE AND CANTILEVER SYSTEM OF THE CLEANING VEHICLE

CROSS-REFERENCE TO RELATED APPLICATION

Relevant subject matter is disclosed in a pending U.S. patent application Ser. No. 13/707,605 filed on Dec. 7, 2012, and entitled "CLEANING VEHICLE AND CLEANING APPARATUS OF THE CLEANING VEHICLE", which is assigned to the same assignee with this patent application.

BACKGROUND

1. Technical Field

The present disclosure relates to cleaning vehicles and, particularly, to a cleaning vehicle for photovoltaic panels.

2. Description of Related Art

In photovoltaic facilities, photovoltaic panels need to be cleaned at regular intervals. However, there is no customized cleaning vehicle for the photovoltaic panels. Therefore, there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean "at least one."

Figure 1:
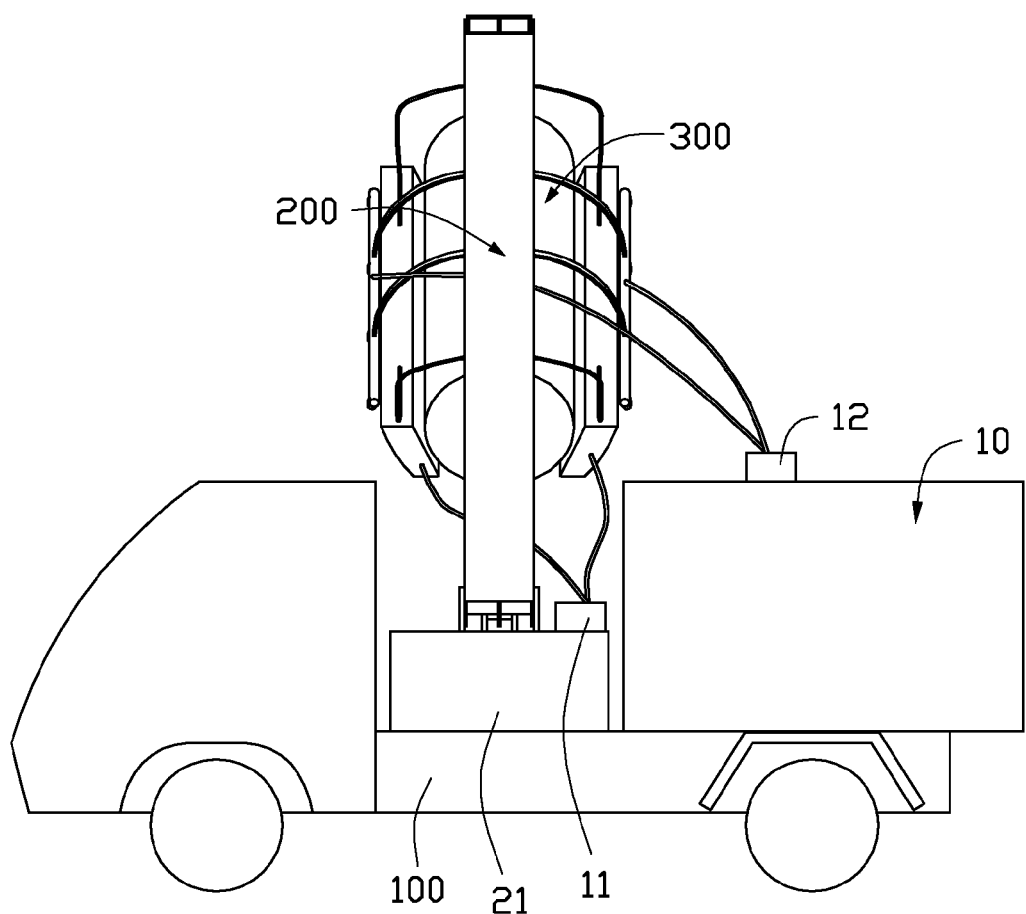
FIG. 1 is a side plan of an embodiment of a cleaning vehicle.
Figure 2:
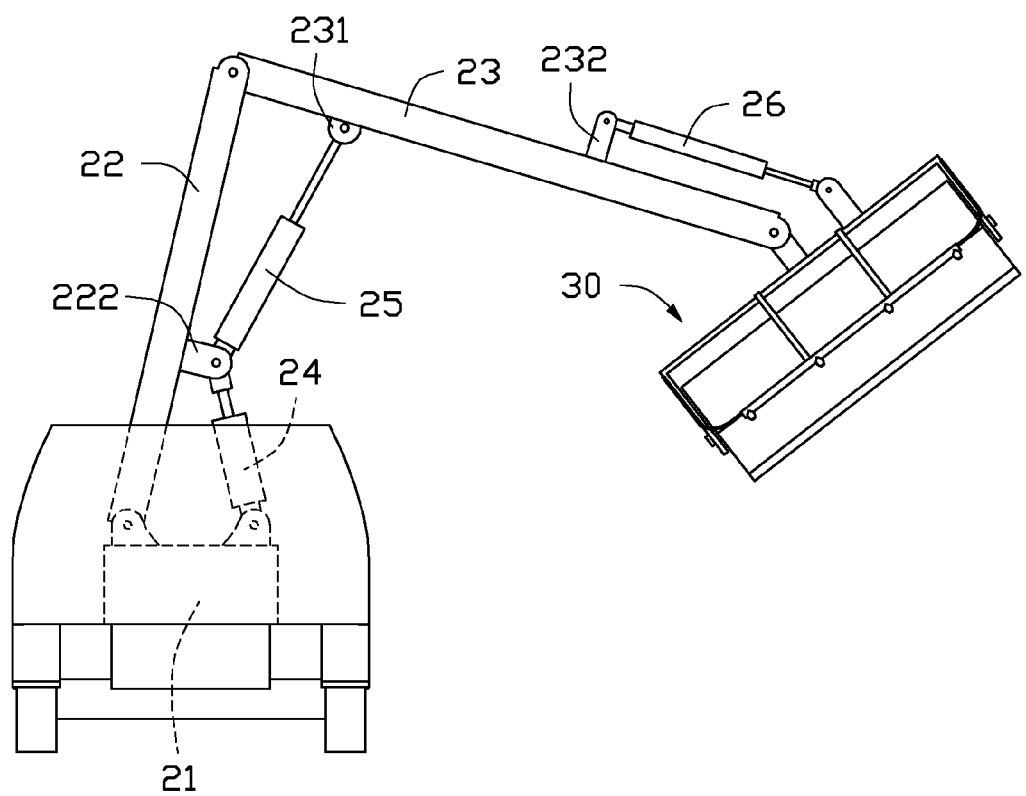
FIG. 2 is a rear plan of the cleaning vehicle of FIG. 1.

FIG. 1 and FIG. 2 show an embodiment of a cleaning vehicle. The cleaning vehicle includes a vehicle body 100, and a cantilever system 200 and a cleaning system 300 arranged on the vehicle body 100. The cleaning system 300 is used for cleaning photovoltaic sheet 400 (shown in FIG. 5).

The cantilever system 200 includes a rotary table 21 fixed on the vehicle body 100, a first cantilever 22 pivotably mounted on the rotary table 21, a second cantilever 23 pivotably connected to the first cantilever 22, a first adjusting pole 24, a second adjusting pole 25, and a third adjusting pole 26. A mounting portion 222 is formed at a middle of the first cantilever 22. Two opposite ends of the first adjusting pole 24 are pivotably connected to the mounting portion 222 and the rotary table 21, respectively. The second cantilever 23 includes a first mounting tab 231 formed on a part of the second cantilever 23 adjacent to the first cantilever 22 and a second mounting tab 232 formed on a part of the second cantilever 23 adjacent to the cleaning system 300. Two opposite ends of the second adjusting pole 25 are pivotably connected to the mounting portion 222 and the first mounting tab 231, respectively. Two opposite ends of the third adjusting pole 26 are pivotably connected to the second mounting tab 232 and the cleaning system 300, respectively. In this embodiment, the first adjusting pole 24, the second adjusting pole 25, and the third adjusting pole 26 are all telescopic hydraulic cylinders.

The cleaning system 300 includes a water tank 10 set on the vehicle body 100, a vacuum pump 11, and a cleaning apparatus 30. A water pump 12 is set on the water tank 10.

Figure 3:
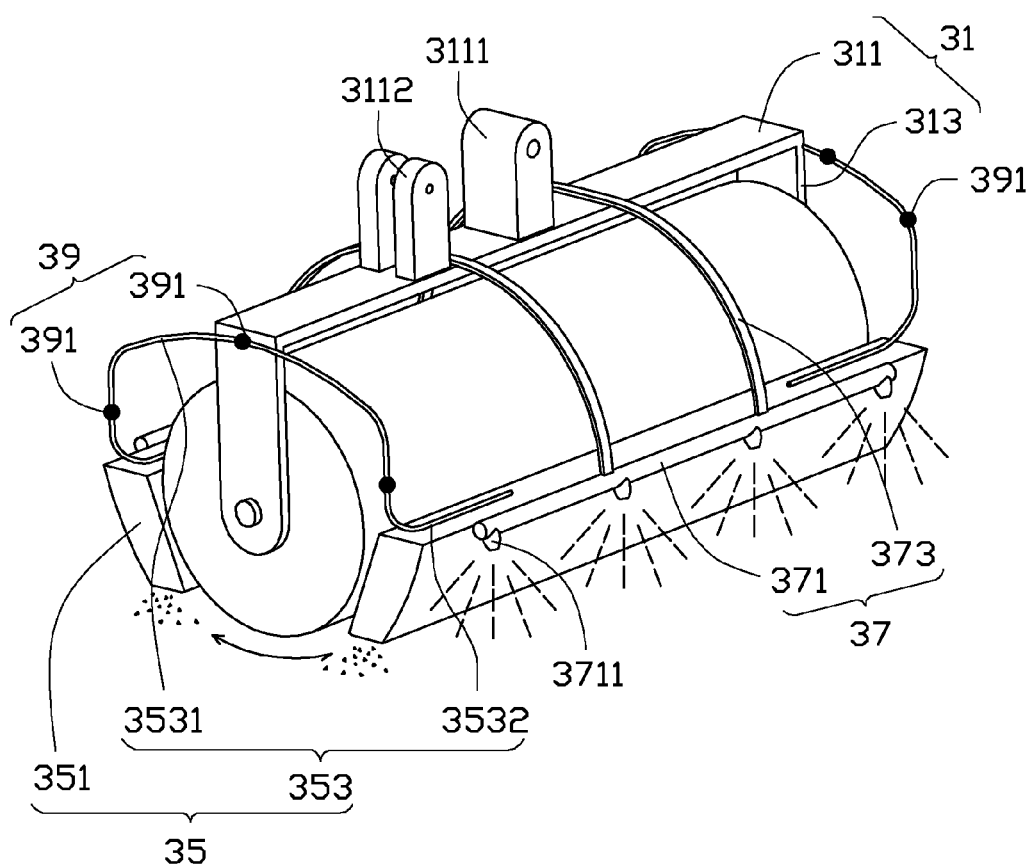
FIG. 3 is an assembled, isometric view of an embodiment of a cleaning apparatus of the cleaning vehicle of FIG. 1.
Figure 4:
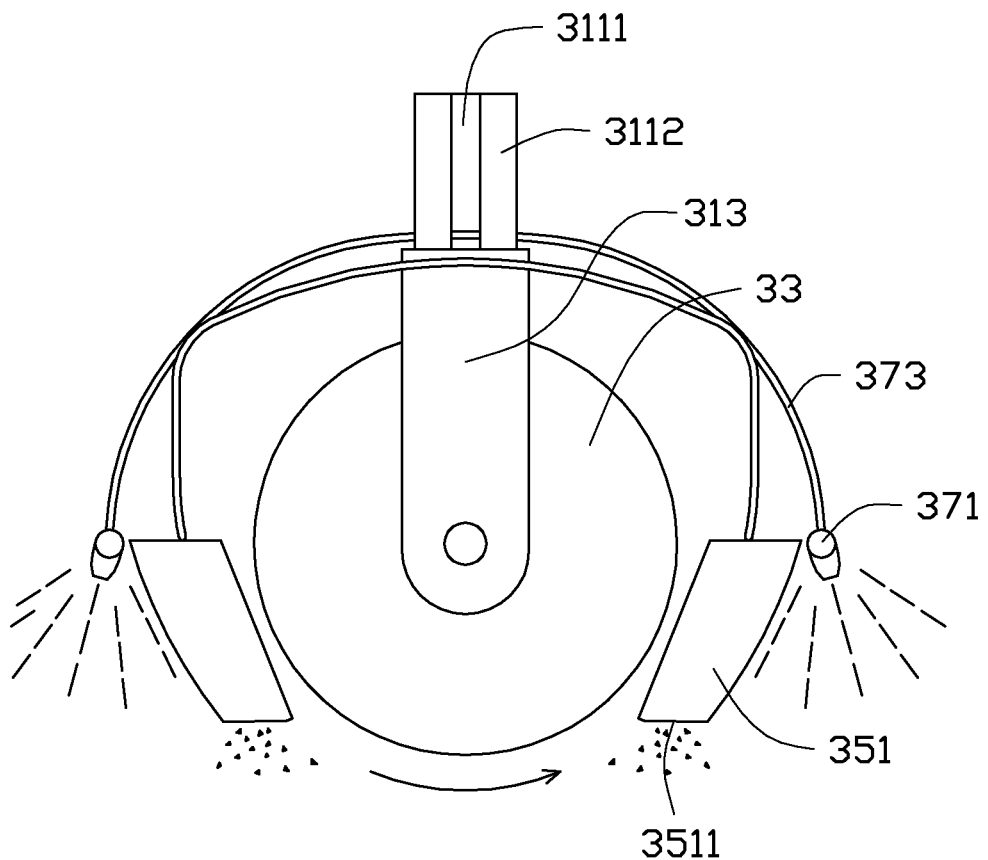
FIG. 4 is a side plan of the cleaning apparatus of FIG. 3.

FIG. 3 and FIG. 4 show that the cleaning apparatus 30 includes a substantially U-shaped bracket 31, a sweeping unit 33, a blower-vacuum unit 35, a spraying unit 37, and a sensor unit 39. The bracket 31 includes a top wall 311 and two sidewalls 313 extending from opposite ends of the top wall 311. The top wall 311 forms a first mounting block 3111 pivotably connected to the second cantilever 23 opposite to the first cantilever 22, and a second mounting block 3112 pivotably connected to the third adjusting pole 26.

The sweeping unit 33 is roller shaped, and rotatably mounted between the sidewalls 313 with opposite ends of the sweeping unit 33.

The blower-vacuum unit 35 includes two elongated blower-vacuum members 351 located at opposite sides of the sweeping unit 33, and two mounting members 353. The blower-vacuum members 351 each define an elongated opening 3511 in a bottom. The mounting members 353 each include a C-shaped connecting portion 3531 fixed to the corresponding sidewall 313, and two fixing portions 3532 extending from opposite ends of the connecting portion 3531 and fixed to tops of the blower-vacuum members 351 respectively.

The spraying unit 37 includes two pipes 371 located at opposite sides of the sweeping unit 33 and two substantially C-shaped arms 373. A middle of each arm 373 is fixed to the top wall 311. Two opposite ends of each arm 373 are connected to the pipes 371 and communicate with the pipes 371, respectively. A plurality of nozzles 3711 are defined in a bottom of each pipe 371.

The sensor unit 39 includes a plurality of sensors 391 mounted to the mounting members 353. In the embodiment, the sensors 391 are ultrasonic sensors.

Figure 5:
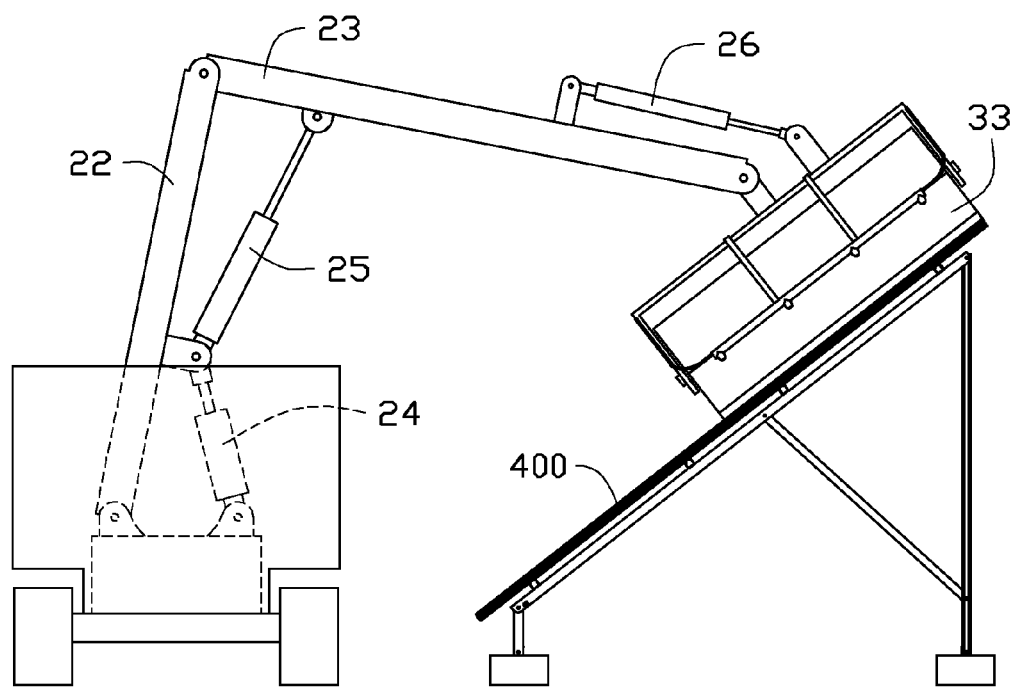
FIG. 5 is a using state view of the cleaning vehicle of FIG. 1.

FIG. 5 shows that when the cleaning system 300 is used for cleaning the photovoltaic sheet 400, the sweeping unit 33 is rotated through an electromotor drive, to sweep surfaces of the photovoltaic sheet 400. The blower-vacuum unit 35 is connected to the vacuum pump 11, to absorb dust attached on the photovoltaic sheet 400. The blower-vacuum unit 35 is also connected to a high pressure air pump, to blow the photovoltaic sheet 400. The pipes 371 of the spraying unit 37 are connected to the water pump 12, to wash the photovoltaic sheet 400.

The first adjusting pole 24 and the second adjusting pole 25 are adjusted to position the cleaning apparatus 30 relative to the photovoltaic sheet 400 in an up-to-down direction. The vehicle body 100 moves, driving the cleaning apparatus 30 relative to the photovoltaic sheet 400 along a direction parallel to the photovoltaic sheet 400. The third adjusting pole 26 is controlled to adjust an angle between the cleaning apparatus 30 and the photovoltaic sheet 400, to make the sweeping unit 33 remain in tight contact with the photovoltaic sheet 400. The sensors 391 sense the distances between the cleaning apparatus 30 and the photovoltaic sheet 400, and send signals to a controller to adjust the first adjusting pole 24, the second adjusting pole 25, and the third adjusting pole 26.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A cleaning vehicle for cleaning a photovoltaic sheet, comprising:
   a vehicle body;
   a cleaning apparatus comprising a bracket, wherein the bracket forms a first mounting block and a second mounting block; and
   a cantilever system comprising a rotary table, a first cantilever comprising a first end pivotably mounted on the rotary table, a second cantilever comprising a first end pivotably connected to a second end of the first cantilever and a second end pivotably connected to the first mounting block of the cleaning apparatus, a first adjusting pole, a second adjusting pole, and a third adjusting pole, wherein a mounting portion is formed on a middle of the first cantilever, the first cantilever comprises a first mounting tab formed on a part adjacent to the first cantilever and a second mounting tab formed on a part adjacent to the cleaning apparatus;
   wherein the first adjusting pole comprises two opposite ends pivotably connected to the mounting portion and the rotary table respectively, the second adjusting pole comprises two opposite ends pivotably connected to the mounting portion of the first cantilever and the first mounting tab of the second cantilever, respectively, the third adjusting pole comprises two opposite ends pivotably connected to the second mounting tab of the second cantilever and the second mounting block of the cleaning apparatus, respectively; and
   wherein the bracket comprises a top wall and two sidewalls extending from opposite ends of the top wall, the cleaning apparatus further comprises a sweeping unit rotatably mounted to the sidewalls, a blower-vacuum unit comprising two blower-vacuum members located at opposite sides of the sweeping unit, and a spraying unit comprising two pipes respectively located at opposite sides of the sweeping unit, and a vacuum pump is connected to the two blower-vacuum members.

2. The cleaning vehicle of claim 1, wherein a water tank is set on the vehicle body, the spraying unit is connected to the water tank through a water pump.

3. The cleaning vehicle of claim 1, wherein the first adjusting pole and the second adjusting pole are adjusted to position the cleaning apparatus relative to the photovoltaic sheet in an up-to-down direction, the vehicle body moves, driving the cleaning apparatus to move relative to the photovoltaic sheet along a direction parallel to the photovoltaic sheet, the third adjusting pole is controlled to adjust an angle between the cleaning apparatus and the photovoltaic sheet, to make the sweeping unit remain in tight contact with the photovoltaic sheet.

4. The cleaning vehicle of claim 1, wherein the cleaning apparatus further comprises a plurality of sensors mounted to the bracket.

5. The cleaning vehicle of claim 4, wherein the sensors sense the distances between the cleaning apparatus and the photovoltaic sheet, and send signals to a controller to adjust the first adjusting pole, the second adjusting pole, and the third adjusting pole.

* * * * *